Oct. 5, 1926.

B. J. GOLDSMITH ET AL 1,601,824

HANDLE CONSTRUCTION

Filed March 24, 1925

INVENTORS
Bertram J. Goldsmith.
Emil Koeb.
BY
Townsend & Decker
ATTORNEYS

Patented Oct. 5, 1926.

1,601,824

UNITED STATES PATENT OFFICE.

BERTRAM J. GOLDSMITH, OF NEW YORK, AND EMIL KOEB, OF TUCKAHOE, NEW YORK, ASSIGNORS TO PERFECT WINDOW REGULATOR CORPORATION, OF LONG ISLAND CITY, NEW YORK, A CORPORATION OF DELAWARE.

HANDLE CONSTRUCTION.

Application filed March 24, 1925. Serial No. 17,912.

This invention relates to improvements in handle connecting and operating mechanism and is particularly adapted for use with window operators for example in closed automobile constructions.

It is a primary object of the invention to provide a readily attachable handle construction which will be positive in its action and neat in appearance.

It is a further object of the invention to provide a suitable support for the handle construction which embodies a clutching or gripping mechanism to retain the handle in its set positon.

Other and more specific objects will appear from the following description.

Figure 1:
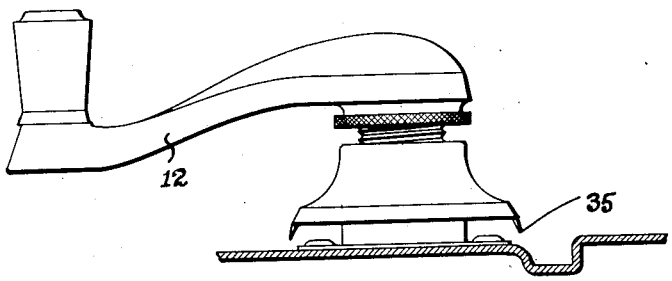
Fig. 1 represents in plan the assembled handle construction and support, parts being in section.
Figure 2:
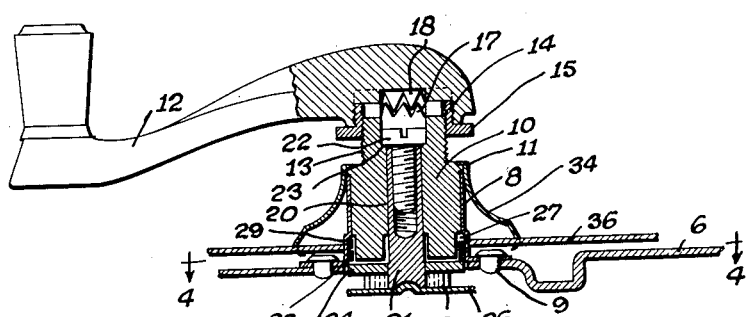
Fig. 2 is a sectional view through the hub of the handle securing and operating mechanism.
Figure 3:
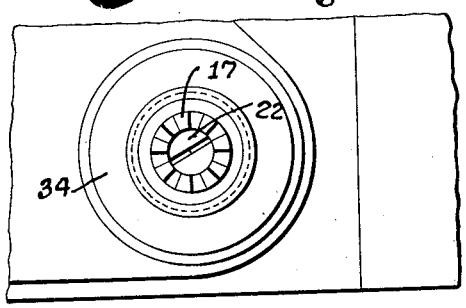
Fig. 3 is a face view of the operating parts with the handle removed.

Referring to the details of the drawing:

There is shown the supporting plate or lockboard 6 which is apertured adjacent the cylindrical guide member 8 secured thereto as by means of the rivets 9 or otherwise. Mounted within the bearing sleeve 8 is the main operating member 10 shouldered as at 11 to fix the position thereof with respect to the bearing sleeve 8. The handle proper 12 is secured to the main operating member 10 as follows:—

The outer or free end of the bearing member 10 is threaded as indicated at 13 and the hub of the handle is threaded as at 14, the threads 13 and 14 being of the reverse type, that is, one part is left-threaded while the other is right-threaded. The nut 15 is threaded to correspond with the threads 13 and 14 so that upon rotation of the nut 15 the handle 12 is drawn axially toward the operating member 10. In order to firmly secure and lock the handle 12 from rotation with respect to the operating member 10, co-operating locking lugs 17 and 18 are formed respectively upon the operating member 10 and inner face of the handle 12 so that, upon the aforementioned axial movement of the handle 12, the locking elements or teeth 17 and 18 are drawn into engagement. This forms a strong and secure lock between the handle 12 and operating member 10. It is to be observed that no parts of the lock extend through or beyond the handle 12 but that when in position the outer face of the handle 12 is unbroken.

The operating member 10 is axially bored as indicated at 20 to receive the second operating member 21 passing therethrough and secured in place as by means of the machine bolt 22 resting upon the shouldered portion 23 of the operating member 10. The outer extremity of the second operating member 21 carries a guide disk 24 and toothed wheel 25, both permanently secured to said operating member 21 for rotation therewith. The inner end portion of the second operating member 21 may be further supported and braced by means of the brace members 26 rigidly secured to the main support 6.

Figure 4:
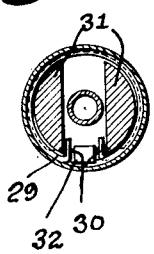
Fig. 4 is a sectional view substantially on the line 4—4 of Fig. 2.
Figure 5:
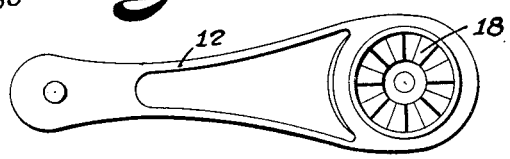
Fig. 5 is an elevational view of the inner face of the handle.

Between the sleeve member 8 and the main operating member 10 there is provided a pocket 27 to receive the clutching ring 28 which, according to the present embodiment, is formed of substantially two convolutions of spring steel 29 normally expanded into engagement with the inner face of the rigid bearing sleeve 8. The free ends of the spring element 29 are bent angularly, as in Fig. 4, to provide spaced offset extensions 30. The bottom of the operating member 10 is cut away to provide spaced lugs 31 adapted to engage the ends 30 of the spring clutch member. The disk 24 carries an upwardly extending lug 32 mounted between the extensions 30 for a purpose to be hereinafter referred to.

There is preferably provided a shield member or escutcheon 34 having a bearing upon the main operating member 10 and formed at the outer edges thereof with points 35 adapted to be secured to the upholstery 36. The shield 34 thus entirely envelopes the bearing sleeve and operating member 10 to further add to the attractiveness of the installation.

In installing the device the sleeve member 8 is rigidly secured to the main support or lockboard 6. The disk 24 carrying the second operating member 21 and toothed wheel 25 are then placed in position within or adjacent the opening in the lock-board and supported by the brace member 26. It is to be understood that the toothed wheel 25 meshes with a rack of an operating arm or gear operatively connected with an operating arm, which arm is in engagement with and moves the part operated upon, for example the sliding window of an automobile body. The clutch band 29 is then inserted in the pocket 27 and the main operating member 10 inserted into the guide member 8. The bolt 22 is then screwed into the member 21 to secure these parts in position. The shield 34 is next inserted in position and secured to the upholstery. The nut 15 is then screwed a short distance onto the extended end of the operating member 10 and the handle 12 is pressed against the extended end of the nut 15 so that, upon further rotation of the nut 15, the handle 12 is drawn inwardly to cause the teeth 17 and 18 to mesh, the installation then being completed and ready for use.

In operation when it is desired to raise or lower a window, for example, the handle 12 is rotated carrying with it the main operating member 10. Rotation of the member 10 causes one or the other of the extensions 31 to engage the clutch ends 30 so as to unwrap the clutch band within the pocket 27 so that the clutch band may be moved easily in either direction. One end 30 of the clutch thus engages the lug 32 carried by the disk 24 of the second operating member, so that the toothed wheel 25 is rotated to move the window or other operated element in the desired direction. It will be seen that rotation of the arm 12 in either direction unclutches the clutch band 29 but that the toothed wheel 25 moving with lug 32 is unable to cause a rotation of the handle 12 since movement of the lug 32 against the ends 30 of the clutch merely tends to make the clutch band more firmly engage within the rigid guide member 8.

While we have shown and described a specific embodiment of our invention it is to be understood that this merely illustrates the same and that we are limited only as set forth in the appended claims.

What we claim as our invention is:—

1. In combination, a support, a rotatable operating member secured against longitudinal movement relatively to said support, a detachable manual operating member, said members having cooperating axially arranged locking elements constructed to be brought into engagement by an axial movement of one of said members relatively to the other and to limit such axial movement, and a securing element having means for engagement with both said members for holding said members in assembled position with said locking elements in rigid engagement.

2. In combination, a guide, a rotatable operating member supported therein, said member being threaded for a portion of the length thereof, a handle, said handle being threaded oppositely to the threads on said member, and a nut threaded for engagement with the threaded portions of member and handle for securing said parts together by rotation of said nut.

3. In combination, a rotatable operating member, said member being threaded for a portion of the length thereof, a handle, said handle being threaded oppositely to the threads on said member, said member and handle being provided with co-operating locking elements, and a nut threaded for engagement with the threaded portions of member and handle for securing the locking elements of said parts together by rotation of said nut.

4. In combination, a guide, a rotatable operating member supported therein, said member being threaded for a portion of the length thereof, a handle, said handle being threaded oppositely to the threads on said member, a nut threaded for engagement with the threaded portions of member and handle for securing said parts together by rotation of said nut and a shield constructed to cover said guide and the major portion of said operating member, said nut being exposed outwardly of said shield.

5. In combination with a fixed bearing, a rotatable operating member supported thereby, a manual operating member, said members having tapered cooperating engaging surfaces adapted to be brought into engagement by an axial movement of one of said members relatively to the other and to limit such axial movement, and means engaging said operating member and manual member for drawing said members together to cause said surfaces to be engaged.

Signed at New York, in the county of New York and State of New York this 23rd day of March A. D. 1925.

EMIL KOEB.
BERTRAM J. GOLDSMITH.